United States Patent
Gallagher, III et al.

(10) Patent No.: US 7,079,009 B2
(45) Date of Patent: *Jul. 18, 2006

(54) ANTICOLLISION PROTOCOL WITH FAST READ REQUEST AND ADDITIONAL SCHEMES FOR READING MULTIPLE TRANSPONDERS IN AN RFID SYSTEM

(75) Inventors: William F. Gallagher, III, Phoenixville, PA (US); Ronald Salesky, Tabernacle, NJ (US); Shinichiro Inui, Haddonfield, NJ (US); Riccardo Benedetti, Voorhees, NJ (US); Samuel Alexander, Phoenix, AZ (US); Lee R. Furey, Phoenix, AZ (US); Youbok Lee, Chandler, AZ (US)

(73) Assignees: Checkpoint Systems, Inc., Thorofare, NJ (US); Microchip Technology Incorporated, Chandler, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/754,259

(22) Filed: Jan. 9, 2004
(Under 37 CFR 1.47)

(65) Prior Publication Data
US 2004/0140884 A1    Jul. 22, 2004

Related U.S. Application Data

(63) Continuation of application No. 09/428,033, filed on Oct. 27, 1999, now Pat. No. 6,963,270.

(51) Int. Cl.
    *H04Q 5/22* (2006.01)
(52) U.S. Cl. ............ 340/10.2; 370/314; 370/311; 370/336; 340/572.1
(58) Field of Classification Search ............ 340/10.2, 340/10.32, 10.35, 10.5, 572.1, 572.7; 370/314, 370/347, 447, 442, 457
See application file for complete search history.

(56) References Cited

U.S. PATENT DOCUMENTS

| 4,734,680 A | 3/1988 | Gehman et al. |
| 4,799,059 A | 1/1989 | Grindahl et al. |

(Continued)

FOREIGN PATENT DOCUMENTS

| EP | 0439237 A1 | 7/1991 |
| WO | WO 98/22903 | 5/1998 |
| WO | WO 9967734 A1 | 12/1999 |
| WO | WO 0004485 A1 | 1/2000 |

OTHER PUBLICATIONS

Press Release: PHILIPS to announce their ICODE product for retail applications at Scan-Tech Europe 98, Transponder News, Oct. 1998, printout from web site address: www.rapidttp.co.za/transponder/presre27.html, printout date: Aug. 23, 1999 (1 page).

(Continued)

*Primary Examiner*—Edwin C. Holloway, III
(74) *Attorney, Agent, or Firm*—Caesar, Rivise, Bernstein, Cohen & Pokotilow, Ltd.

(57) ABSTRACT

Arbitration of multiple transponders, such as RFID tags, occurs in an interrogation field. The arbitration process is custom-tailored for individual applications, under software control, by the transponder reader or tag reader. Different wake-up slots are calculated for each tag during successive transmission cycles based upon the tag ID and the transmission cycle number. The tag reader may also send a special command to a tag to read its data and cause the tag to become decoupled from the environment. The tags may be selectively placed in either a tag-talk-first mode or a reader-talk-first mode. Furthermore, the tag reader may send a special fast read command to the tag which includes a read request and at least one parameter of the read request.

10 Claims, 9 Drawing Sheets

U.S. PATENT DOCUMENTS

| | | | |
|---|---|---|---|
| 5,124,699 A | | 6/1992 | Tervoert et al. |
| 5,182,543 A | | 1/1993 | Siegel et al. |
| 5,189,397 A | | 2/1993 | Watkins et al. |
| 5,218,343 A | | 6/1993 | Stobbe et al. |
| 5,307,349 A | * | 4/1994 | Shloss et al. ............... 370/442 |
| 5,347,263 A | | 9/1994 | Carroll et al. |
| 5,383,134 A | | 1/1995 | Wrzesinski |
| 5,430,441 A | | 7/1995 | Bickley et al. |
| 5,440,560 A | * | 8/1995 | Rypinski .................... 370/457 |
| 5,446,447 A | | 8/1995 | Carney et al. |
| 5,448,230 A | | 9/1995 | Schanker et al. |
| 5,477,215 A | | 12/1995 | Mandelbaum |
| 5,489,908 A | | 2/1996 | Orthmann et al. |
| 5,500,651 A | | 3/1996 | Schuermann |
| 5,530,437 A | | 6/1996 | Goldberg |
| 5,530,702 A | | 6/1996 | Palmer et al. |
| 5,539,394 A | | 7/1996 | Cato et al. |
| 5,541,928 A | | 7/1996 | Kobayashi et al. |
| 5,550,547 A | | 8/1996 | Chan et al. |
| 5,591,951 A | | 1/1997 | Doty |
| 5,602,538 A | | 2/1997 | Orthmann et al. |
| 5,621,412 A | | 4/1997 | Sharpe et al. |
| 5,621,735 A | | 4/1997 | Rochester, Jr. et al. |
| 5,627,544 A | | 5/1997 | Snodgrass et al. |
| 5,646,607 A | | 7/1997 | Schurmann et al. |
| 5,856,788 A | | 1/1999 | Walter et al. |
| 5,929,779 A | | 7/1999 | MacLellan et al. |
| 5,963,144 A | * | 10/1999 | Kruest ....................... 340/10.1 |
| 6,097,292 A | * | 8/2000 | Kelly et al. .............. 340/572.7 |

OTHER PUBLICATIONS

Press Release: Philips I-CODE in Retail, Transponder, (as copied from "On the Move" Mar. 1999 edition, printout from web site address: www.rapidttp.co.za/transponder/presre39.html, printout date: Aug. 23, 1999 (2 pages).

News Release: New 'multimode' RFID Chip presented by Mikron/Philips, Transponder News, Mar. 3, 1997, printout from web site address: www.rapidttp.co.za/transponder/news4.html, printout date: Aug. 23, 1999 (1 page).

Key Technical Data of I-Code IC, Philips Electronics, printout from web site address: www.semiconductors.com/identification/products/contactless/I-code/keyfeatures/, printout date: Aug. 23, 1999 (1 page).

Contactless Products: The HITAG Family, Philips Electronics, printout from web site address: www.semiconductors.com/identification/products/contactless/hitag, printout date: Aug. 23, 1999 (3 pages).

MIFARE® Standard Card IC MFI ACS50, Philips Electronics, printout from web site address: www.semiconductors.com/identification/products/contactless/mifare/ics50/, printout date: Aug. 23, 1999 (2 pages).

International Search Report for PCT/US00/31497, mailed Mar. 13, 2001, 1 page.

International Search Report dated Jan. 25, 2005.

* cited by examiner

| "MATCH" CODE = TAG ID BIT RANGE A:B |
|---|
| [4(TC+1)+3]MODULO32:[4TC]MODULO32 |

Fig. 4

EXAMPLE: TAG ID = $825FE1A0

| TC | "MATCH" | ACK |
|---|---|---|
| 0 | $A0 | $1 |
| 1 | $1A | $E |
| 2 | $E1 | $F |
| 3 | $FE | $5 |
| 4 | $5F | $2 |
| 5 | $25 | $8 |
| 6 | $82 | $0 |
| 7 | $08 | $A |

Fig. 5

| ACKNOWLEDGE = TAG ID BIT RANGE A:B |
|---|
| [4(TC+2)+3]MODULO32:[4TC+8]MODULO32 |

Fig. 6

| TIMESLOTS | WAKE-UP SLOT = TAG ID BIT RANGE A:B |
|---|---|
| 16 | [[4(TC+1)−1]MODULO32:[4TC]MODULO32] XOR TC LSb |
| 64 | [[4(TC+1)+1]MODULO32:[4TC]MODULO32] XOR TC LSb |

*Fig. 7*

EXAMPLE: TAG ID = $825FE1A0

| TC | RELEVANT NUMBER | | SLEEP TIME 16 | SLEEP TIME 64 | SLEEP TIME | | SLEEP TIME 16 SEMI-INV. | SLEEP TIME 64 SEMI-INV. | |
|---|---|---|---|---|---|---|---|---|---|
| TAG ID = $825FE1A0 | | | | | | | WAKE-UP SLOT | | |
| 0 | $A0 | b1010 0000 | $0 | $20 | 0 | 32 | $0 | $20 | 32 |
| 1 | $1A | b0001 1010 | $A | $1A | 10 | 26 | $5 | $25 | 37 |
| 2 | $E1 | b1110 0001 | $1 | $21 | 1 | 33 | $1 | $21 | 33 |
| 3 | $FE | b1111 1110 | $E | $3E | 14 | 62 | $1 | $01 | 1 |
| 4 | $5F | b0101 1111 | $F | $1F | 15 | 31 | $F | $1F | 31 |
| 5 | $25 | b0010 0101 | $5 | $25 | 5 | 37 | $A | $1A | 26 |
| 6 | $82 | b1000 0010 | $2 | $02 | 2 | 2 | $2 | $02 | 2 |
| 7 | $08 | b0000 1000 | $8 | $08 | 8 | 8 | $7 | $37 | 55 |

*Fig. 8*

ANTICOLLISION PROTOCOL WITH FAST READ REQUEST AND ADDITIONAL SCHEMES FOR READING MULTIPLE TRANSPONDERS IN AN RFID SYSTEM

CROSS REFERENCE TO RELATED APPLICATION

This application is a continuation of copending Application No. 09/428,033, filed Oct. 27, 1999 now U.S. Pat. No. 6,963,270, entitled "ANTICOLLISION PROTOCOL WITH FAST READ REQUEST AND ADDITIONAL SCHEMES FOR READING MULTIPLE TRANSPONDERS IN AN RFID SYSTEM," the entire disclosure of which is incorporated herein by reference.

BACKGROUND OF THE INVENTION

Radio frequency identification (RFID) systems are used to detect and prevent inventory shrinkage and to perform inventory management functions in a variety of retail establishments, apparel and mass merchandisers, supermarkets, libraries, video stores, and the like. In general, such systems use an intelligent tag which is secured to or associated with an article (or its packaging), typically an article which is readily accessible to potential customers or facility users. The process wherein intelligent tags are secured to or associated with an article (or its packaging) is often referred to as "tagging" the article. In general, such RFID systems are employed for detecting the presence (or the absence) of a unique intelligent tag and, thus, a protected article within a surveilled security area or detection zone, also referred to herein as an "interrogation zone." The detection zone is located at or around an exit or entrance to the facility or a portion of the facility, at the point of sale, or proximate to a hand-held, portable interrogator.

One type of RFID system which has gained widespread popularity uses an intelligent tag which includes a self-contained, passive resonant circuit in the form of a small, generally planar printed circuit which resonates at a predetermined detection frequency within a detection frequency range. A transmitter, which is also tuned to the detection frequency, transmits electromagnetic energy or an interrogation signal into the detection zone. A receiver, tuned to the detection frequency detects amplitude disturbances on the electromagnetic field that are imparted by the intelligent tag. When an article having an attached intelligent tag moves into or passes through the detection zone, the intelligent tag is exposed to the transmitted energy. That is, the intelligent tag is interrogated. The detection of such an output signal by the receiver indicates the presence of an article with an intelligent tag within the detection zone and the receiver activates an alarm to alert appropriate security or other personnel.

One well-known RFID system has a transmitting and detecting frequency in the radio frequency range. The intelligent tags used with such systems are referred to as RF tags or RF intelligent tags. The RF tags associated with each article may be identical so that all articles having an intelligent tag, regardless of article size or value, return an identical signal to the receiver. Alternatively, the RF tags may be passive resonant intelligent tags which return unique identification codes. U.S. Pat. Nos. 5,446,447 (Canvey et al.), 5,430,441 (Bickley et al.), and 5,347,263 (Carroll et al.) disclose three examples of such intelligent tags. These intelligent tags typically include an integrated circuit to generate a unique identification code. Such "intelligent" tags provide additional information about the article detected in the zone of the interrogator. These intelligent tags typically respond to, and transmit signals, in the radio frequency range, and are known in the art as "radio frequency identification (RFID) tags or "intelligent tags." RFID tags are used in RFID systems. Intelligent tags may also resonate at non-RF frequency bands, and may be referred generically as "EAS markers."

Existing RFID systems of the type described above and of other types have been shown to be effective in preventing the theft or unauthorized removal of articles.

One problem with attempting to read multiple RFID tags within an interrogation zone of a reader is that more than one tag could be activated by the reader or interrogator at about the same time, such that two or more tags may transmit their identification information to the reader at about the same time, thus causing the information to collide, which corrupts the information and prevents the reader from obtaining the desired information. To overcome such data collisions, some interrogators include a means for controlling the transmission of data from individual tags, for example, by shutting individual tags off for predetermined time periods after a response signal is transmitted. Other systems include tags which include circuitry to detect the simultaneous transmission of data by multiple tags. Upon detection of such simultaneous transmissions, the tags abort their transmissions and wait for a prescribed time prior to retransmission, usually for a period of time that is set by a random number. However, this method requires that the tags include collision detection circuitry and a random number generator, both of which excessively increase the cost of the tag chip and tag, and consume additional power which degrades read range.

Accordingly, there is a need for a method of detecting substantially simultaneous transmission of data by multiple tags at the same frequency located within an interrogation zone and compensating for such multiple transmissions in order to accurately read the data transmitted by each tag.

The present invention fulfills this need by providing an anticollision protocol for simultaneously reading multiple RFID tags located in a field of an interrogating antenna or RFID reader and individually identifying the tags through an arbitration process.

BRIEF SUMMARY OF THE INVENTION

An arbitration process identifies and addresses individual tags in a multiple tag environment. An overview of some useful features is provided below.

(1) Once a tag is identified by its unique serial number, the process allows individual transponders to be either targeted for read or write operations, partitioned into smaller subgroups with related properties, or put into an inactive or sleep state.

(2) The process provides for fast reading of critical data by using a special command sequence that minimizes communication overhead. This command sequence, called the "fast read request," allows for customization of individual applications, wherein the anticollision parameters can be tailored by (i) the number of time slots for transponder communications, (ii) the number of transmissions that an individual transponder is allowed to issue, and (iii) the data rate at which the reader communicates to the transponder. (The transponder data rate is fixed in the disclosed embodiment of the present invention.)

(3) The transponders may be selectively excluded from the fast read mode, wherein the transponders will not respond to a fast read request. This mode may be used in retail, anti-theft applications, where a product tagged with an RFID transponder that has been paid for at the point of sale will not respond to the exit reader's request for item identification, thereby allowing the RFID system to sense only stolen items. To communicate with transponders that are excluded from the fast read mode, a reactivation method is implemented with a fast read bypass command which allows transponders to have the fast read response feature reactivated.

(4) Transponder arbitration may occur in densely tagged environments by selectively removing approximately one half of the transponders from the environment by placing them in an inactive mode, and introducing further randomization in the assignment of a wake-up time slot by performing a bit rotation on the transponder ID.

(5) Immediate communication of critical data may occur from transponders using a tag-talk-first mode of operation, wherein the transponder sends its data immediately upon power up, hence eliminating all communication overhead. Furthermore, the process allows the tag to be selectively placed in either the tag-talk-first mode or a reader-talk-first mode wherein the tag responds only after being fully powered on and receiving a command from the reader.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Certain terminology is used herein for convenience only and is not to be taken as a limitation on the present invention. In the drawings, the same reference numerals are employed for designating the same elements throughout the several figures.

FIGS. 1a–1d, taken together, show a detailed data flowchart of the anticollision protocol in accordance with a preferred embodiment of the present invention. The protocol has five major parts, including reactivation, selection, inactivation, detection and processing. The specific details of each part are self-explanatory, and thus are not described in further detail herein. The description below also further explains the individual parts.

Transmission Period/Transmission Cycles

Figure 2:
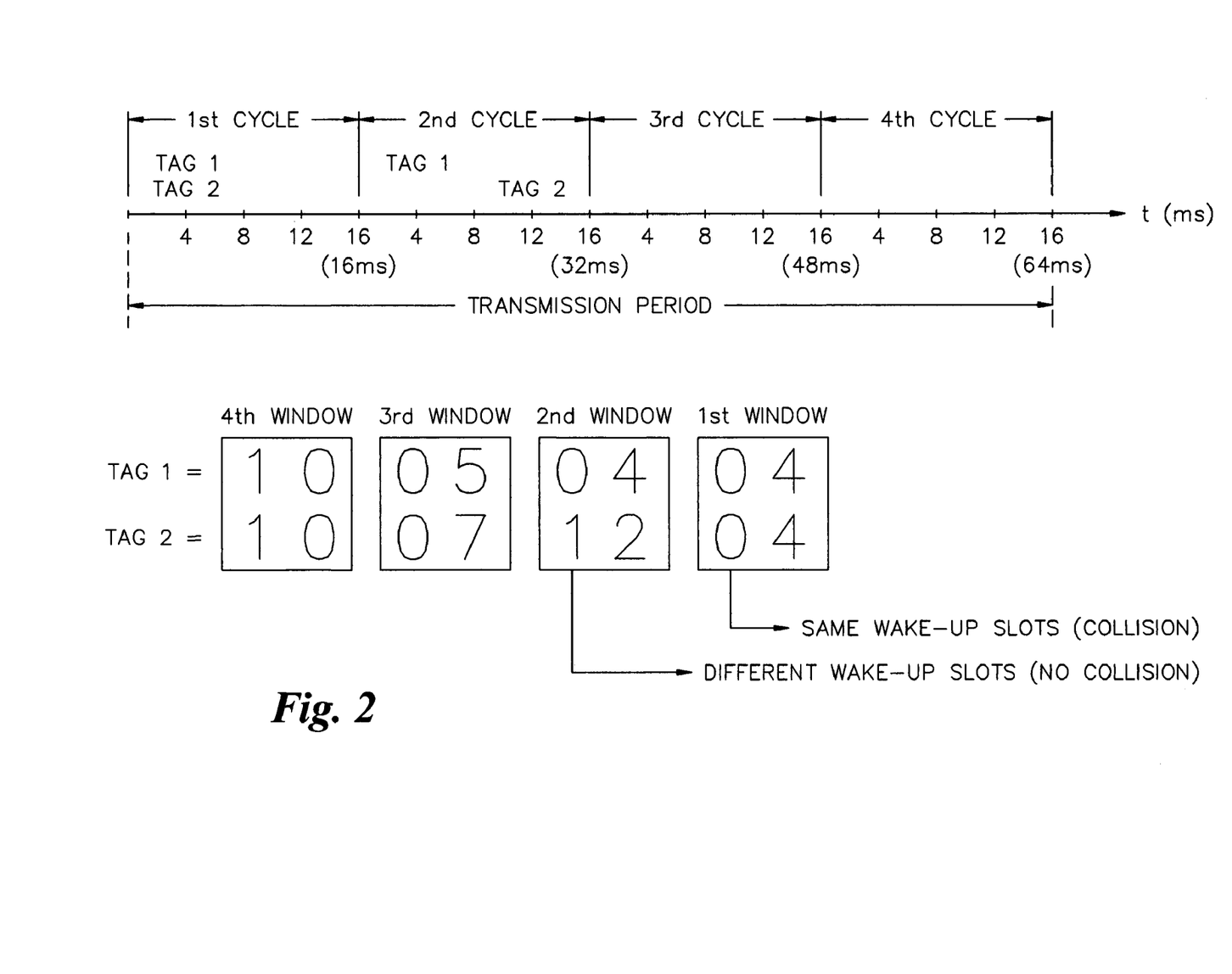
FIG. 2 shows a transmission period for a tag used in the protocol of FIGS. 1a–1d, as well as an example of wake-up slots for two tags.

In the present invention, tags respond to a tag read request from a tag reader. Referring to FIG. 2, the total time of a tag response is a tag transmission period. Each transmission period has a plurality of consecutive tag transmission cycles, each transmission cycle including a plurality of discrete wake-up time slots. In the example of FIG. 2 which is for illustration purposes only, there are four transmission cycles in the transmission period, and each transmission cycle has sixteen potential wake-up time slots.

Assignment of Wake-Up Time Slots

Each tag is assigned to a wake-up time slot. Collisions occur whenever two tags have the same wake-up time slot. In the present invention, different grouping of consecutive bits of the tag ID and the transmission cycle determine the wake-up slot. More particularly, the different grouping of consecutive bits progresses sequentially through the bits of the tag identification numbers in a sliding window manner. An example of this scheme is illustrated in FIG. 2. Tag 1 has an ID of 1544 (converted from a binary string), and tag 2 has an ID of 1784. During the first transmission cycle, the bit window spans the least significant four bits which have a decimal equivalent between 1 and 15. The decimal equivalent of the bit window determines the wake-up time slot for the first transmission cycle. Thus, tag 1 is assigned a wake-up time slot at 4 ms and tag 2 is also assigned a wake-up time slot at 4 ms. Tags 1 and 2 will likely collide, resulting in a potential communication failure between the tag reader and one or both tags. However, during the second transmission cycle, the window shifts four binary digits to the left. Tag 1 is again assigned a wake-up time slot at 4 ms, but tag 2 is now assigned a wake-up time slot at 12 ms. No collisions should occur between tags 1 and 2 during the second transmission cycle. The process repeats for subsequent transmission cycles. Many variations are possible on the sliding window concept. For example, the bits may shift one bit at a time or may skip bits to create new windows, instead of shifting to consecutive non-overlapping bits.

The number of bits in a grouping is a function of the number of time slots. Thus, in the example of FIG. 2, there are sixteen potential time slots. Accordingly, the window has a maximum bit length of four. A more detailed explanation of the time slot calculation for an actual transponder is provided below with respect to FIGS. 7 and 8.

One conventional scheme for selecting wake-up time slots uses a combination of the transponder ID and a hash value sent by the reader. See, for example, U.S. Pat. No. 5,539,394 (Cato et al.). In contrast to this scheme, the scheme in the present invention does not require any information from the reader. The transponder ID and transmission cycle number are both internally available within the transponder. Also, the scheme in the present invention does not have to generate and send a hash number. The reader used for the present invention can thus be less complex. Also, the chip in the transponder ID does not need a circuit to generate a random number from a received hash number, since the chip's internally programmed ID provides the random number.

Reader to Transponder Communications (1) Fast Read Request

The RFID reader or interrogator broadcasts commands to all transponders present in the detection field. All command sequences from the reader begin with a fast read request which includes the read request, as well as at least one parameter of the read request. Parameters include the communications data rate of the tag reader (e.g., Normal or Fast Mode), the number of time slots within each transmission cycle, and the maximum number of transmission cycles that the tag is allowed to broadcast in (TCMAX). The request for a fast read, along with the respective parameter information, are communicated to the transponder via a series of "gaps," or timed drop-outs in the RF field. In the preferred embodiment, these pulses are sent in groups of four, and occur over a 1.4 msec interval. Each tag responds to the fast read request by sending its ID, and other data including tag parameters and fast read field data.

Figure 3A:
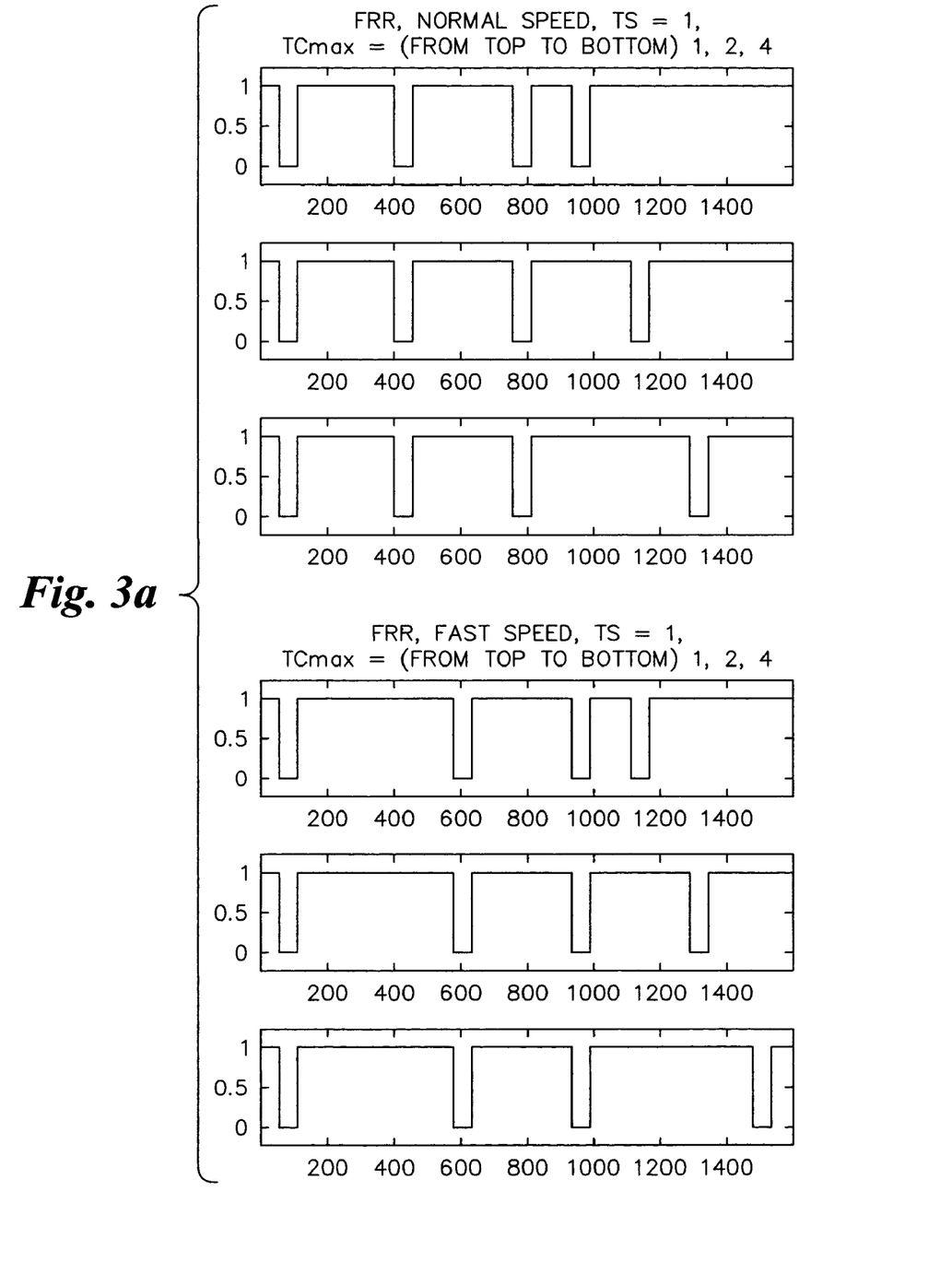
FIGS. 3A and 3B show the timing of fast read request sequences for a tag reader.
Figure 3B:
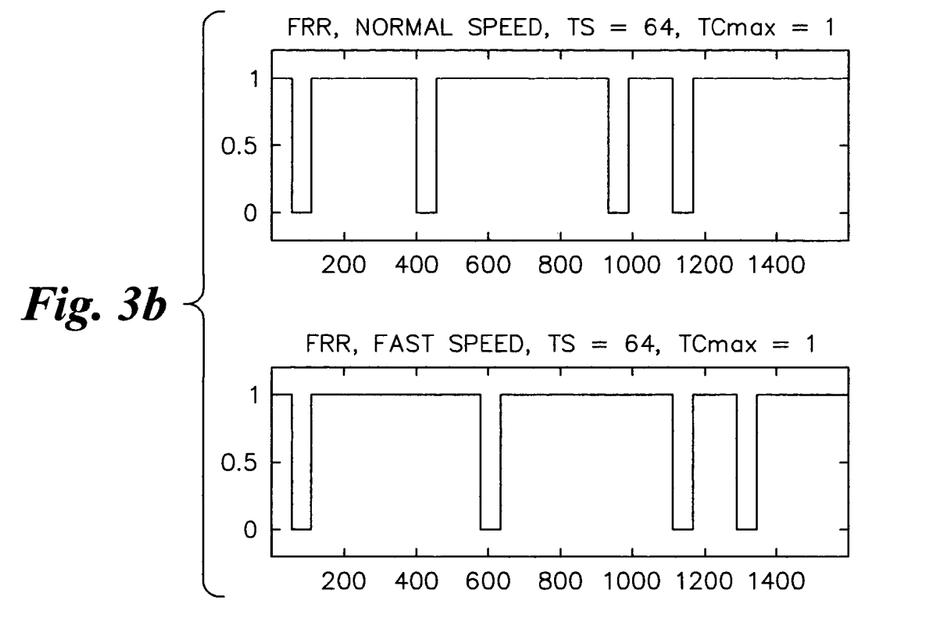

FIGS. 3A and 3B show the exact timing of these fast read request sequences for a given combination of reader data rate, TCMAX, and number of time slots.

(2) Matching Codes

A transponder responds in a calculated time slot to the fast read request. After a transponder completes transmission of its ID and, optionally, its fast read field, the reader sends commands called matching codes to the transponder to direct the transponder to either perform a read or write transaction, or to go into an inactive mode. If the reader chooses to perform read or write transactions on that particular transponder, the reader sends a Matching Code Type 2 or MC2. If the reader does not need to transact further with the transponder, the reader sends a Matching Code Type 1 or MC1, which instructs the transponder to go into an inactive mode.

In one conventional inactive mode, the response circuitry of a transponder is turned off or deactivated. This mode is conventionally referred to as a "sleep mode" or "quiet mode." In this mode, the transponder is still capable of responding if turned back on or reactivated. No tag detuning occurs in the sleep mode.

In another conventional inactive mode, the transponder is "decoupled" or "detuned" by being tuned to a different frequency so that it cannot respond to an interrogation, even if its response circuitry is active. In a multiple tag environment, it is desirable to decouple read transponders so that they do not interfere with adjacent active transponders or with the receiver antenna of the interrogator or reader. In the conventional decoupling or detuning scheme, a transponder is programmed to detune itself automatically after it responds. The detuning process is thus not controlled by the interrogator or reader. One disadvantage of this scheme is that the reader loses all control over if, or when, the transponder goes to sleep. In certain situations, it may be desirable to keep the transponder awake even after it has transmitted its ID.

In contrast to the conventional decoupling or detuning schemes, the present invention allows the reader or interrogator to control or initiate the decouple or detune process by sending MC1 when desired. The decoupling may be performed using schemes such as described in U.S. patent application Ser. No. 09/185,775 filed Nov. 4, 1998, entitled "RFID TAG HAVING PARALLEL RESONANT CIRCUIT FOR MAGNETICALLY DECOUPLING TAG FROM ITS ENVIRONMENT," now U.S. Pat. No. 6,072,383, or U.S. Application No. 09/035,027 filed Mar. 5, 1998, entitled "APPARATUS FOR MAGNETICALLY DECOUPLING AN RFID TAG," now U.S. Pat. No. 6,208,235, the disclosures of both being incorporated by reference herein. The schemes described in these disclosures must be modified to allow for reader control of the decoupling process, as opposed to the transponder-initiated decoupling process described in these disclosures. The reader-initiated transmission of MC1 is thus an important feature of the present invention.

In an alternative embodiment of the present invention (not shown in FIGS. 1a–1d), the inactive mode causes the transponder to be put to sleep, instead of causing the transponder to be detuned. This embodiment is less expensive to implement since the circuitry for decoupling a transponder is more expensive than the circuitry for putting transponders to sleep.

Figure 4:
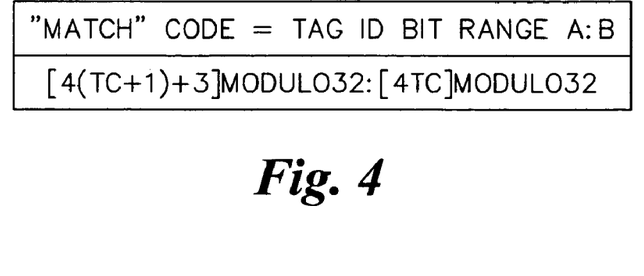
FIG. 4 shows the equation for calculating Matching Codes used in the flowchart of FIGS. 1a–1d.
Figure 5:
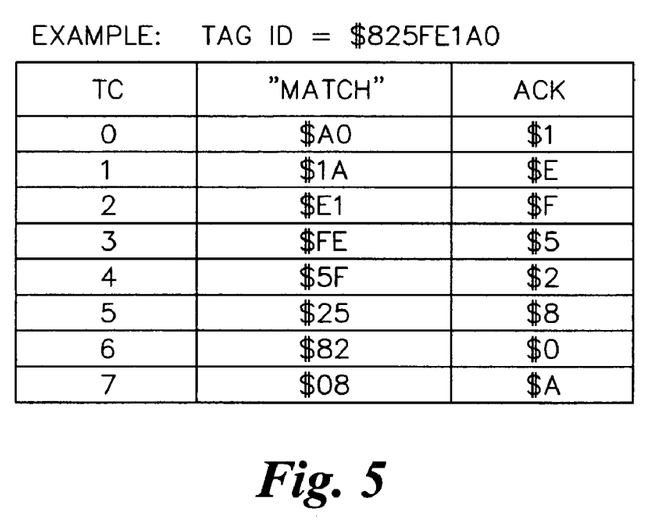
FIG. 5 shows an example of the Matching Code for each transmission cycle for a specific tag ID.

FIG. 4 shows the bit-wise equations for calculating the Matching Codes, and FIG. 5 shows an example of the match code for each transmission cycle for a specific tag ID. In the example of FIG. 4, Matching Codes are eight bits in length, and are calculated from the transponder ID and transmission counter. More specifically, the "match" part of the matching code (MC) is eight bits of the 32-bit tag ID echoed back to the tag after a fast read response in the detection loop of the anticollision flowchart of FIGS. 1b and 1d. The decision as to which tag ID bits to choose for respective codes is a function of the tag ID and TC. The modulo-32 portion of the calculation causes a "wrap-around" when calculating the matching code.

A Matching Code may be sent in a "listening window" which is a time period of 600 μsec nominally in the preferred embodiment, immediately following a fast read response message from the transponder. Alternatively, the Matching Code may be sent after all time slots have expired.

In the special case of a fast read request message having a TCMAX=1, Matching Code queuing may be used. That is, the Matching Code is not sent immediately following the fast read response, but rather at the end of all of the time slots (that is, at the end of each transmission cycle or at the end of the transmission period) corresponding to a fast read request. This batch queuing technique is advantageous when reading multiple tags in the field because when a Matching Code is sent immediately to a transponder, it will be communicating in several time slots that may be used for additional transponders to send their fast read response(s).

(3) Selection Loop

In certain applications, it is desirable to have the ability to form a subset of individual transponders from a larger set. For example, consider a processing line where a large number of red and blue containers with RFID transponders pass through an interrogation zone, and the system is only interested in processing the blue containers. The selection loop in the FIG. 1c flowchart is used to partition the lot of blue containers into a smaller subset.

Figure 6:
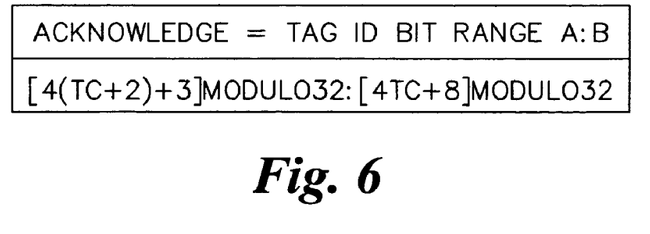
FIG. 6 shows the equation for calculating a tag Acknowledge code which is sent in response to a fast read request.

The selection loop is a holding place for the subset of transponders. Once in this loop, the transponders periodically wake up, send a short acknowledge message, shown in FIG. 6, and listen for an acknowledge message from the reader. The acknowledge code is four bits of the 32 bit tag ID sent to a tag known to be in the selection loop of the anticollision flowchart of FIGS. 1a–1d. Once a transponder receives the acknowledge code from the reader, the transponder is placed in the processing loop where it can be read from or written to, and/or made inactive, in the same manner as transponders which are not partitioned off into the selection loop. FIG. 5 shows an example of the acknowledge code for each transmission cycle.

To access the selection loop in the preferred embodiment of the invention, a fast read request with TCMAX>1 (i.e., TCMAX is greater than 1) must be sent. An MC2 is then sent to the transponder to put it into the selection loop.

Consider again, for example, the red and blue containers wherein it is desired to temporarily make the transponders on the red containers inactive, without affecting the transponders on the blue containers. To accomplish this goal, the red transponders are not sent matching codes so when their transmission counter expires, they will not respond to processing targeted for blue transponders.

(4) Fast Read Bypass

Figure 3C:
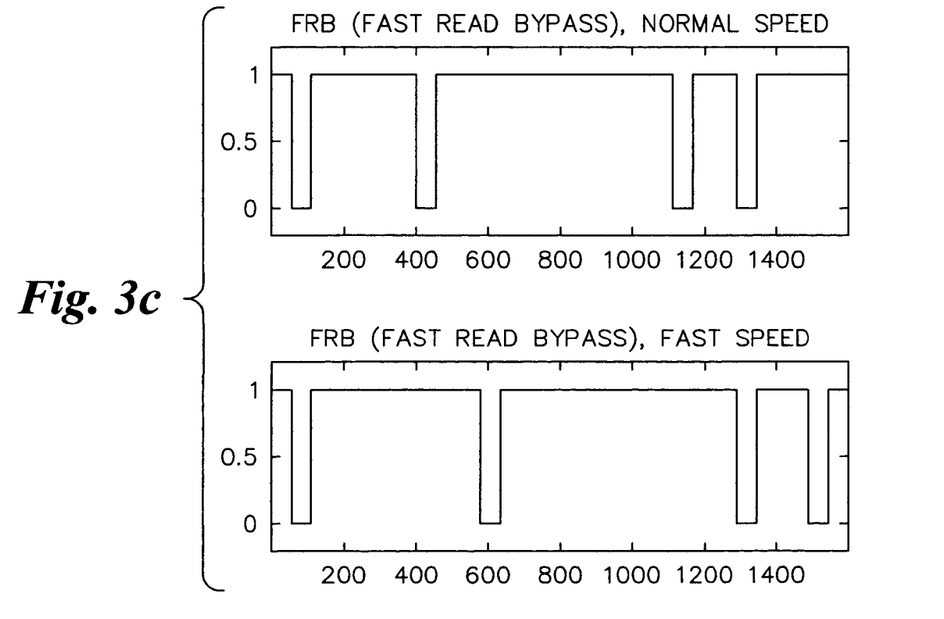
FIG. 3C shows the timing of fast read bypass sequences for a tag reader.

If a transponder has its fast read bit cleared or set to "0," it will not respond to the fast read request message, and consequently, cannot be written to or read from. Accordingly, the reader may issue a Fast Read Bypass command to address this problem. A fast read bypass command allows the transponder to reveal its ID to the reader, and later be put into the processing loop. The timing of this command, in the preferred embodiment, is shown in FIG. 3C.

(5) General Commands

The set of general commands includes a Read command, Write Command, End Process command, Set/Clear Talk First, and Set/Clear Fast Read bit command.

The general structure of these commands is as follows:
Command+Address+Data+(Parity or CRC)

(6) Read Commands

The system reads data from the transponder in 32 bit blocks by sending a read command, a block address and a parity bit.

To perform a block read in the preferred embodiment, the reader sends a three bit command, 010, a five bit block address, and an even parity bit. Even parity means that a "0" or "1" symbol is sent at the end of the command message so as to make the number of "1's" in the read command an even number. No data is sent to the transponder for this command.

(7) Write Command

The system writes data to a specific address in the transponder memory in 32 bit blocks. A Cyclical Redundancy Code (CRC) is transmitted by the reader to the transponder for verification of data integrity. The transponder verifies that the CRC is correct for the particular data transmitted. If it is not, the message is aborted and no data is written in the transponder memory.

In the preferred embodiment, the reader sends a three bit command, 101, a five bit block address, the 32 bit data to be written, and a 16 bit CRC.

CCITT–16CRC polynomial: $X^{16}+X^{12}+X^5+X^0$ (8) End Process Command

When the reader has finished processing a given transponder, an End Process command is issued to cause the transponder to go into the inactive mode.

In the preferred embodiment, the End Process command is a three bit command, 011, followed by a 01010 in the address field. A zero is appended for even parity.

(9) Set/Clear Talk First Bit

Special commands are available to explicitly set the Talk First Bit to a "1" or "0." If the bit is set to a "1," the transponder sends out a fast read response message immediately upon power up, without being addressed by the reader, hence, the term "Talk First." If the bit is cleared to a "0," the transponder waits for a command from the reader before sending any messages.

To set the Talk First bit, in the preferred embodiment, the three bit command of 011 is sent, followed by a 10010 in the address field. To clear the Talk First bit, in the preferred embodiment, the three bit command of 011 is sent, followed by a 10100 in the address field.

(10) Set/Clear Fast Read Bit

Special commands are available to explicitly set the Fast Read Bit to a "1" or "0." If the bit is set to a "1," the transponder sends out a fast read response message if the reader issues a fast read request. If the bit is cleared to "0," the transponder will not respond to a fast read request message. To allow for processing on a transponder which has its Fast Read Bit cleared, the reader must first issue a fast read bypass command.

To set the Fast Read bit, in the preferred embodiment, the three bit command of 011 is sent, followed by a 10011 in the address field. To clear the Fast Read bit, in the preferred embodiment, the three bit command of 011 is sent, followed by a 10101 in the address field.

(11) Fast Read Bypass

A Fast Read Bypass command is sent to enable communications with the transponders with the FR bit cleared. This command is similar to the set of Fast Read Request commands. It is a timed series of four pulses over a 1.575 msec time period. The timing of these pulses or gaps in the illumination field, in the preferred embodiment, is shown in FIG. 3C.

Transponder to Reader Communications (1) Tag-Talk-First

A tag-talk-first mode is used for applications where the transponder is in the field for a limited amount of time, such as in high speed conveyor and/or sorting systems. In this mode, the transponder sends its data immediately upon power-up.

In the preferred embodiment, a bit is set in the transponder to indicate Tag-Talk-First, which is bit 30 of the first data block in the transponder. When the bit is cleared, the transponder only become active in response to a reader command sequence or in Reader-Talk-First Mode.

Conventional transponders are designed to operate in either a tag-talk-first mode or a reader-talk-first mode and have no ability to be reprogrammed to operate in a different mode.

The inflexibility of conventional transponders to operate in either mode limits their usefulness. A conventional reader-talk-first transponder may be unable to respond in sufficient time in applications where the transponder is in the interrogation field for a limited amount of time (e.g., a conveyor or sorting system). Alternatively, a conventional tag-talk-first transponder may be undesirable in environments where reader control of transponder responses is important and transponder response time is not a concern. Furthermore, a transponder may be exposed to a plurality of different read environments throughout its life cycle, some which may favor a tag-talk-first protocol and others which may favor a reader-talk-first protocol. Prior to the present invention, the user had to weight the advantages and disadvantages of each protocol and had to select a transponder which best met the user's needs and had to accept the drawbacks of the selected option. The present invention allows the user to select the best option at the appropriate time in the life cycle of the transponder by merely changing one bit in the transponder memory.

(2) Fast Read Response

When the reader sends a fast read request, a transponder that has its fast read bit set or activated broadcasts its fast read response in a given time slot. As discussed above, the time slot is determined from the transponder ID and the transponder's transmission counter. The time slot calculation is shown in FIG. 7, and FIG. 8 shows an example of sleep times and wake-up slots for each transmission cycle for a specific tag ID.

Figure 7:
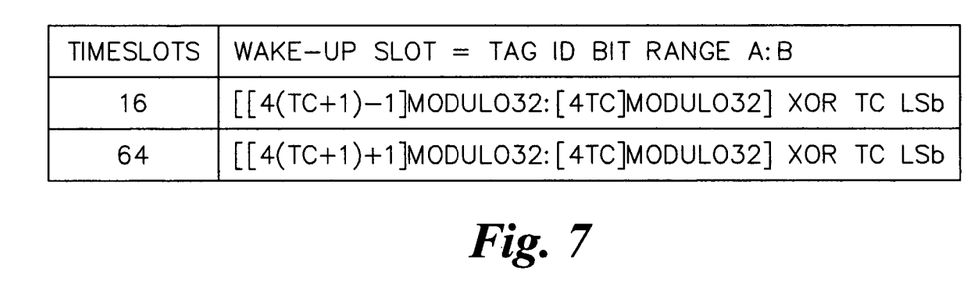
FIG. 7 shows the equation for calculating tag wake-up time slots.
Figure 8:
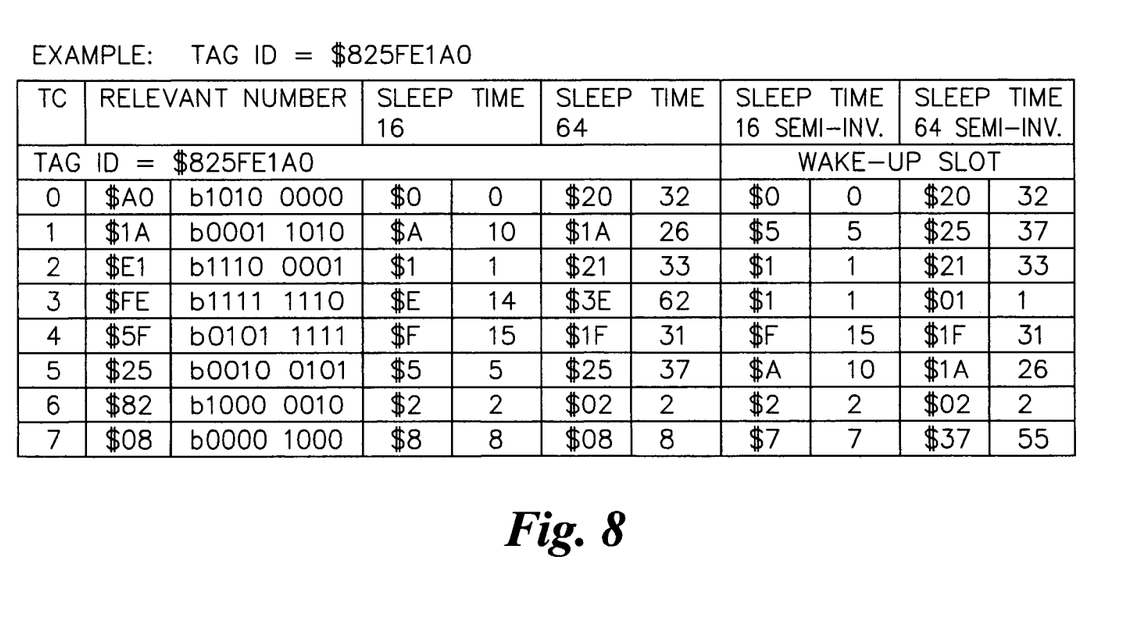
FIG. 8 shows an example of the sleep times and wake-up time slots for each transmission cycle for a specific tag ID.

Referring to FIG. 7, the exclusive-OR in the wake-up slot calculation "semi-inverts" the calculated wake-up slot to randomize worst case tag ID's (e.g., a tag ID of 77777777 or 00000000). "Semi-invert" means inversion of the wake-up slot result every odd transmission count, hence the XOR with TC LSb. The modulo-32 portion of the calculation of the calculation causes a "wrap-around" when calculating the wake-up slot.

The data sent by the transponder is called the fast read response. It consists of a preamble, a tag parameters field, the transmission counter, the 32 bit transponder ID, the fast read field, and a 16 bit CRC which is used for verification of the data. The tag parameters field indicates the length of the fast read data field, which may be 32, 64 or 96 bits in length. The transmission counter starts at zero and is incremented in the transponder on consecutive transmissions. The 32 bit transponder 1D is a unique serial number.

To summarize, the fast read response is as follows:

FRR=Preamble+Transmission Counter+Parity+Tag Parameters+Transponder ID+Fast Read Field+ CRC In the preferred embodiment, the preamble is eight binary 1's, the transmission counter is a modulo-8 three bit number, the Parity is 1 bit for even parity, the Transponder ID is 32 bits, the Fast Read Field is 32, 64 or 96 bits, and the CRC is 16 bits.

(3) Halving Number of Active Transponders and Further Randomization Wake-up Time Slot The anticollision flowchart of FIGS. 1a–1d may remove undetected transponders and further randomize time slot assignments by inactivating transponders with even numbered sleep ID's and by performing a binary rotation of the transponder ID used for the wake-up time slot calculation.

Figure 1A:
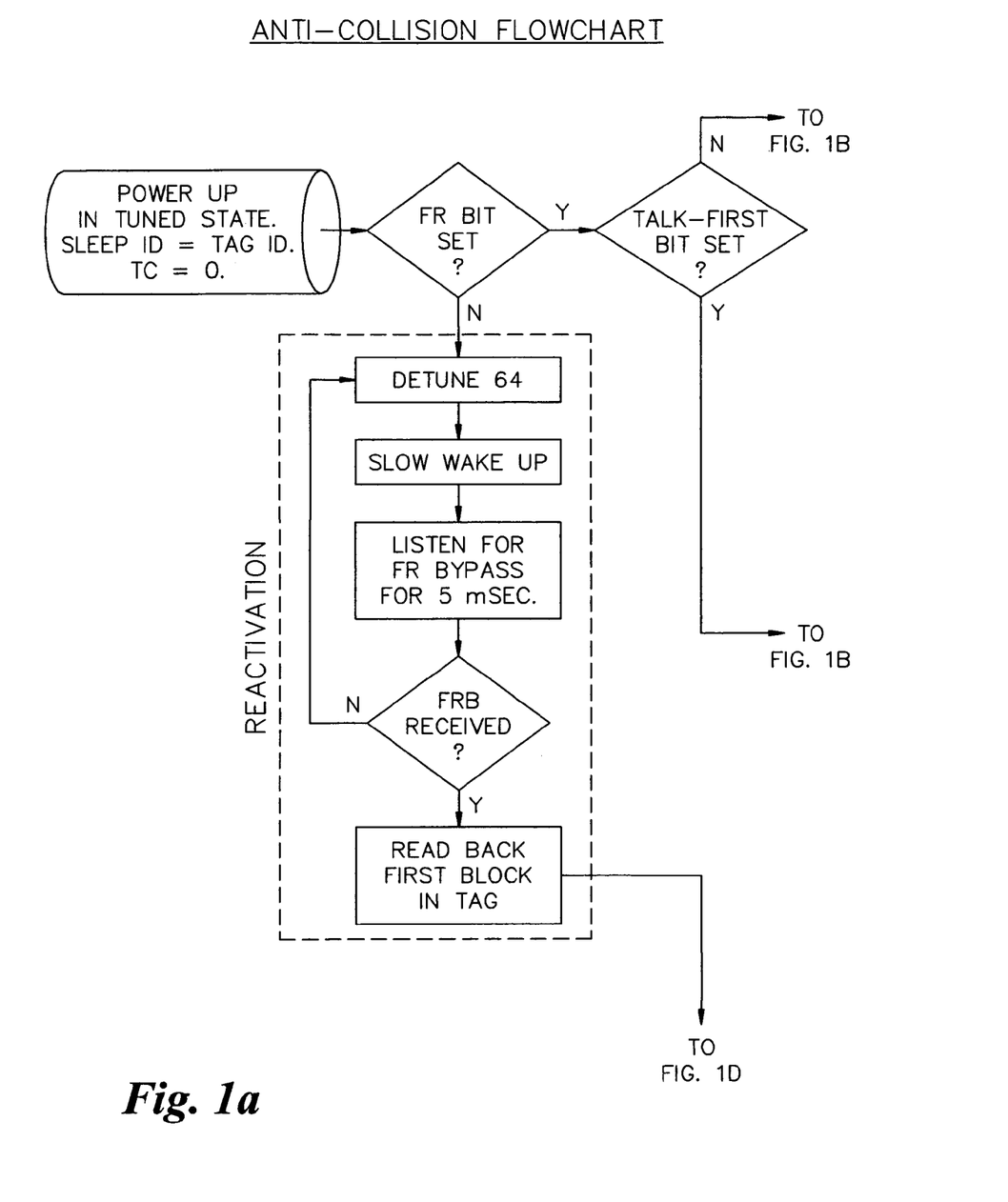
FIGS. 1a–1d, taken together, show a detailed data flowchart of the anticollision protocol in accordance with a preferred embodiment of the present invention.
Figure 1B:
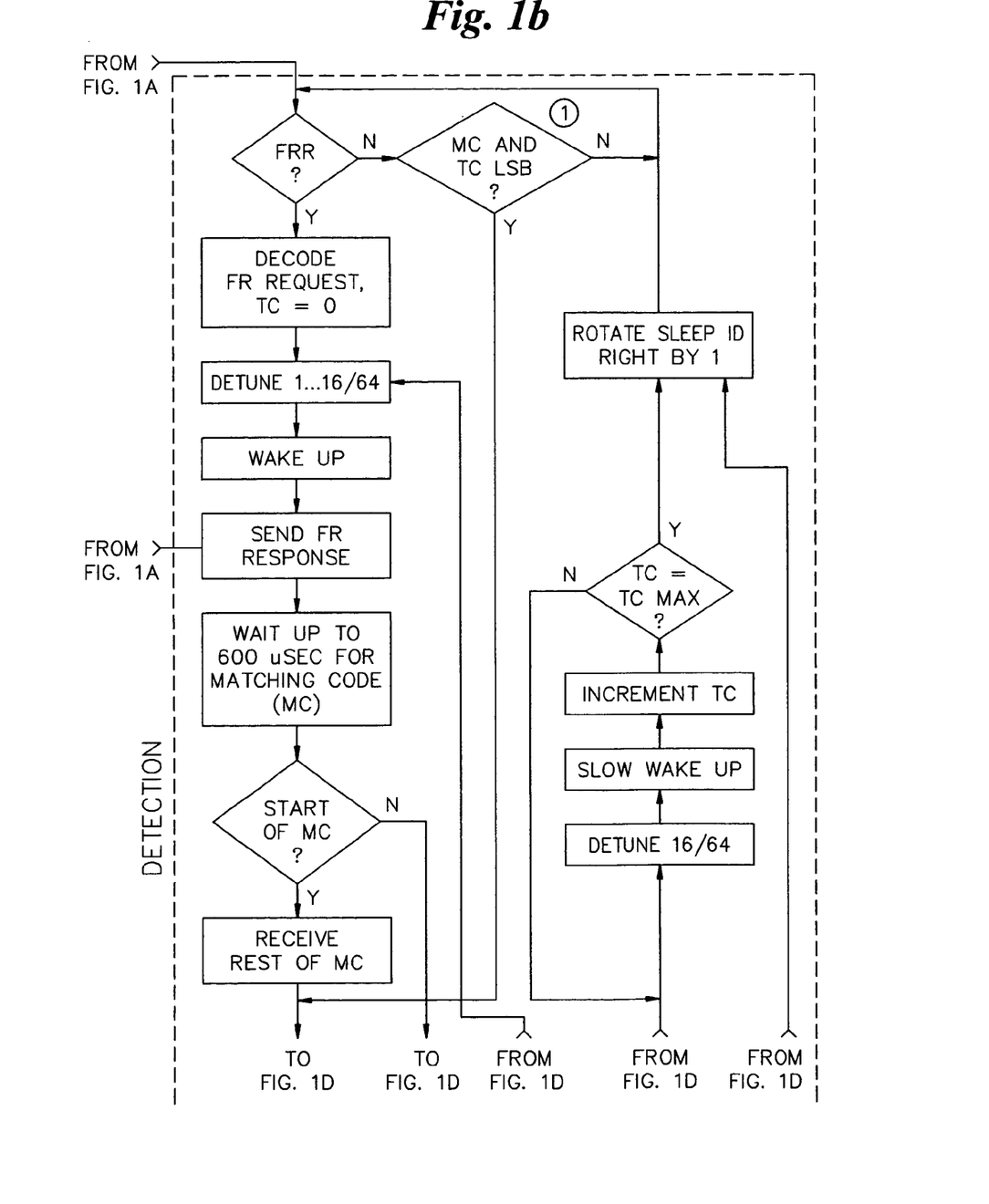
Figure 1C:
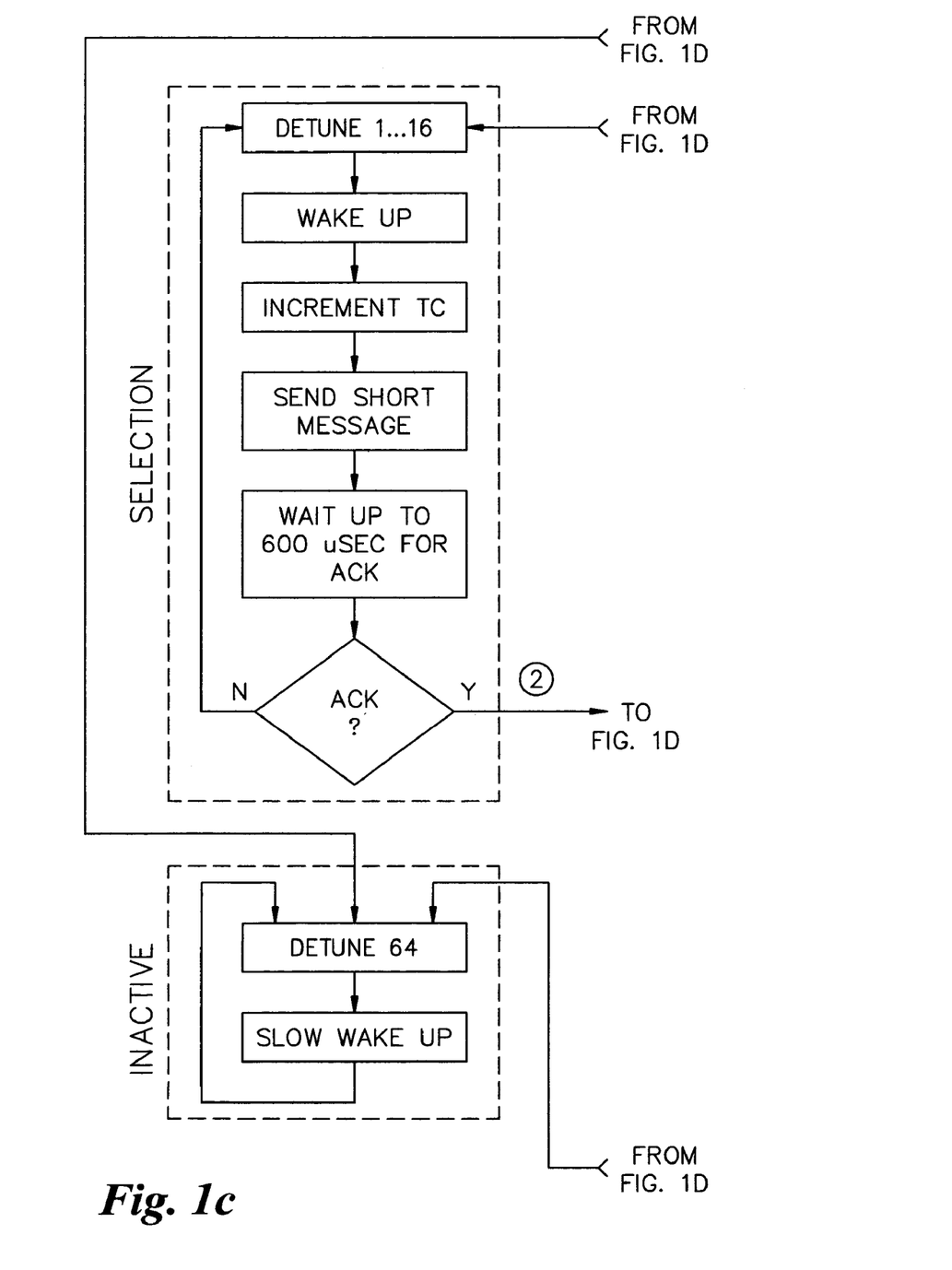
Figure 1D:
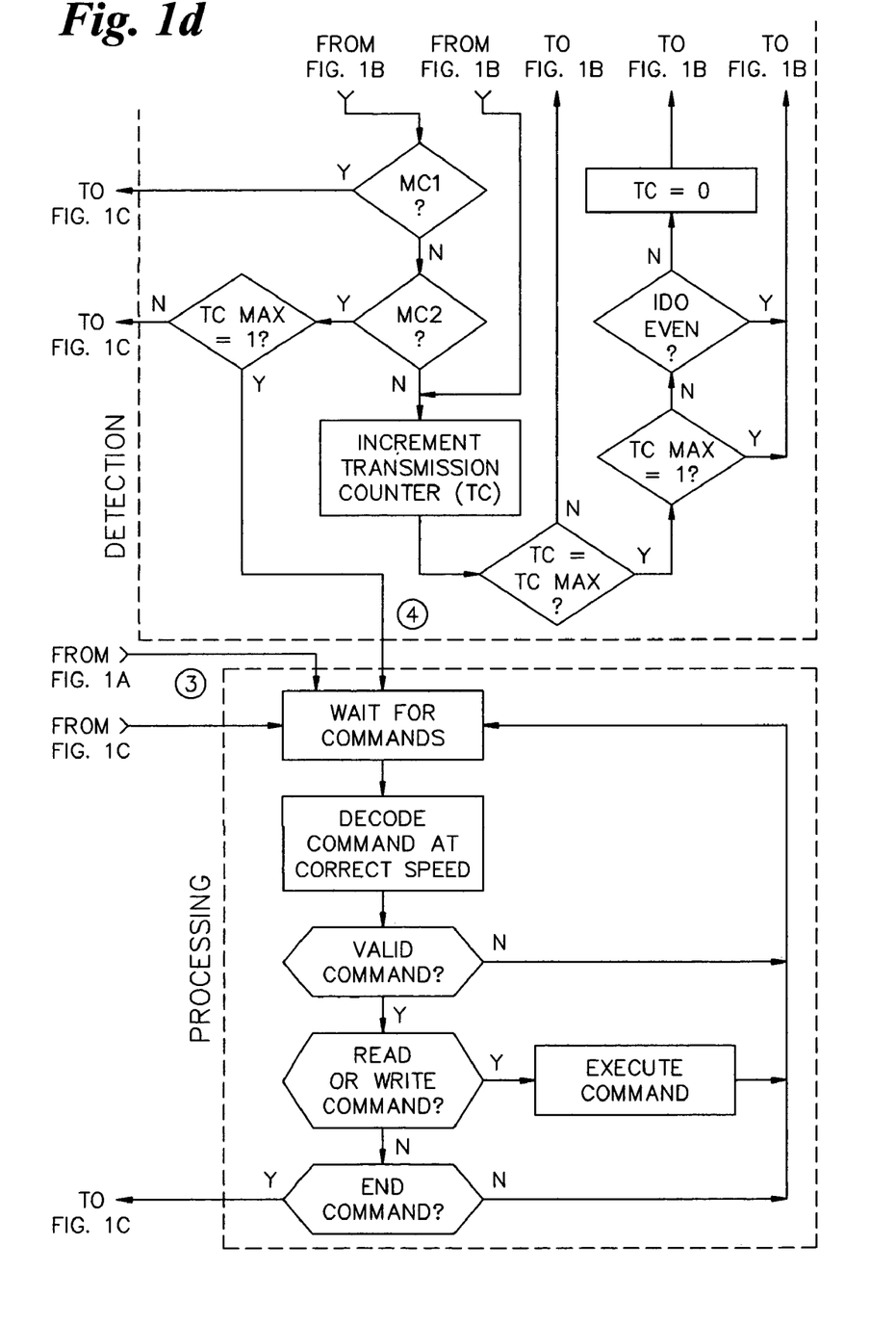

Referring to the Detection loop in FIGS. 1b and 1d, when the transmission counter has elapsed, or when TC=TCMAX and TCMAX=1, the transponder rotates the sleep ID by one bit for use in the wake-up slot calculation shown in FIG. 7. If TC=TCMAX and TCMAX>1, then a test is made on bit 0 of the transponder ID. IF ID0=0, a binary rotation is performed on the sleep ID for the purpose of a wake-up slot calculation. Transponders with ID0=1 are rendered inactive (e.g., by being detuned in the disclosed example, or by being put to sleep in an alternative embodiment) for the duration of the 16 or 64 time slots, thereby allowing approximately half of the transponders (with ID0=0) to have the opportunity to broadcast their fast read response.

This feature is useful if a large number of transponders have similar ID's, and were not read in the first pass of a fast read request and fast read responses. It allows the user to resolve two times the maximum number of tags for a given number of time slots, since the technique restricts (statistically) one-half of the tags from broadcasting.

The RFID tags described in the preferred embodiment resonate at 13.56 MHz and have integral IC chips or transponders. However, the scope of the invention includes other frequencies.

The present invention provides a method of arbitration of multiple transponders in an interrogation field that can be custom-tailored for individual applications, under software control, by the RFID reader. Thus, the user is not restricted by the fixed capabilities of conventional transponders.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A method of selecting wake-up slots for a plurality of radio frequency identification (RFID) tags which are simultaneously exposed to an interrogation field, each tag including an identification number, the method comprising:
   (a) defining a transmission period comprising a plurality of consecutive tag transmission cycles, each transmission cycle including a plurality of discrete wake-up time slots; and
   (b) during each transmission cycle, selecting a wake-up slot for each tag based upon a different grouping of consecutive bits of the tag identification numbers, the different grouping being dependent upon the transmission cycle number.

2. A method according to claim 1 wherein the different grouping of consecutive bits progresses sequentially through the bits of the tag identification numbers in a sliding window manner.

3. A method according to claim 1 wherein the number of bits in the grouping is a function of the number of time slots.

4. A method of controlling response signals in transponders, each transponder including an identification number, each transponder being able to send its identification code after being fully powered on, the method comprising setting a transponder to either (i) a tag-talk-first mode wherein the transponder sends its identification code immediately upon being fully powered on, or (ii) a reader-talk-first mode wherein a fully powered on transponder sends its identification code only after first receiving a read command.

5. A method according to claim 4, wherein the transponder is a passive resonant radio frequency identification (RFID) tag.

6. A method according to claim 4, wherein the transponder includes a talk first mode bit, and the state of the talk first mode bit determines whether the transponder is set in the tag-talk-first mode or the reader-talk-first mode.

7. A method of controlling actions of radio frequency identification (RFID) tags, each of the tags including a read bit, a tag identification number, and data in a fast read field, the method comprising:
   (a) sending a tag command from an interrogator tag reader, the tag command including:
      (i) a fast read request, and
      (ii) at least one parameter of the read request;
   (b) a tag receiving the tag command and responding to the fast read request using the at least one received parameter, the tag response including at least the tag identification number and the data in the fast read field; and
   (c) setting the read bit to a first logic level to allow the tag to respond to the fast read request in the tag command, or setting the read bit to a second logic level to prevent the tag from responding to the fast read request in the tag command.

8. The method of claim 7, wherein the at least one parameter of the read request includes at least one of the communication data rate of the tag reader, the number of time slots within each transmission cycle, and the maximum number of transmission cycles that the tag is allowed to broadcast in.

9. The method of claim 7, wherein the at least one parameter of the read request sent in the tag command is a plurality of parameters including the communications data tale of the tag reader, the number of time slots within each transmission cycle, and the maximum number of transmission cycles that the tag is allowed to broadcast in.

10. The method of claim 7, wherein the at least one parameter of the read request includes the maximum number of transmission cycles that the tag is allowed to broadcast in.

* * * * *